UNITED STATES PATENT OFFICE.

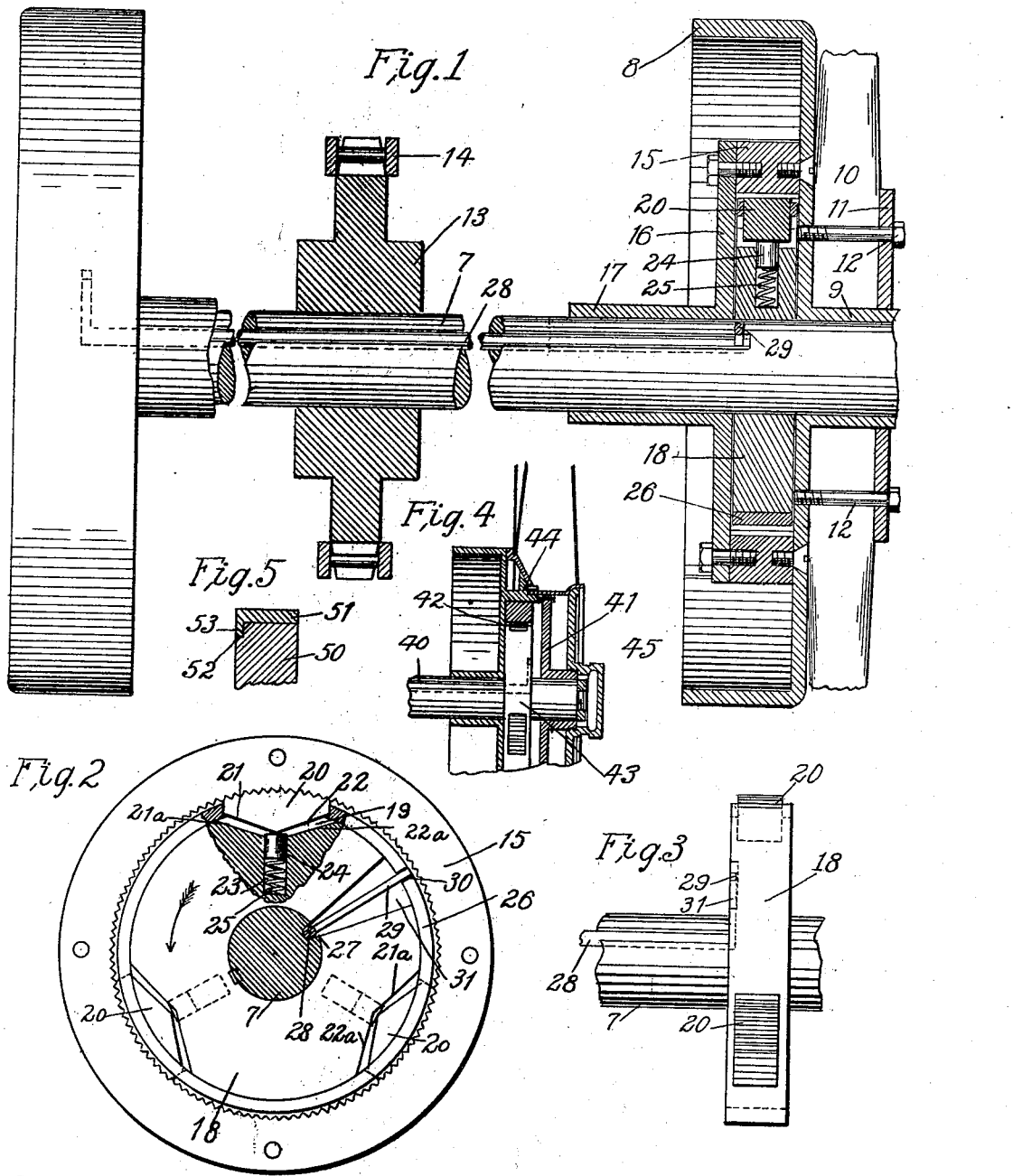

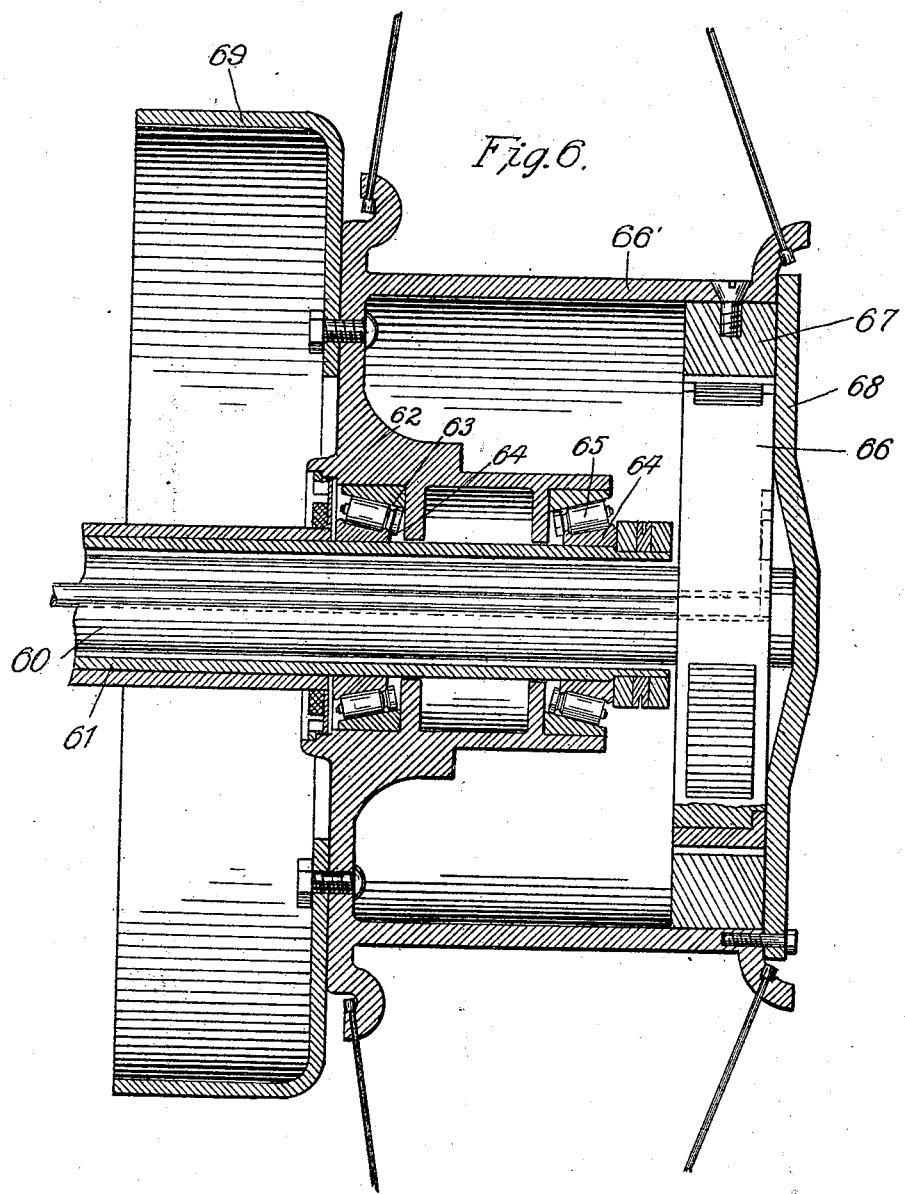

WILLIAM LUXMORE, OF CHICAGO, ILLINOIS.

VEHICLE DRIVING MECHANISM.

1,203,638.  Specification of Letters Patent.  Patented Nov. 7, 1916.

Application filed November 2, 1914. Serial No. 869,806.

*To all whom it may concern:*

Be it known that I, WILLIAM LUXMORE, a citizen of the United States, residing at Chicago, in the county of Cook and State of Illinois, have invented certain new and useful Improvements in Vehicle Driving Mechanism, of which the following is a full, clear, concise, and exact description, reference being had to the accompanying drawings, forming a part of this specification.

My invention relates to vehicle driving mechanism, and its object is to provide improved mechanism of this class which is of sturdy construction and which may be economically manufactured.

The construction of my improved driving mechanism is such that the driving wheels of a vehicle with which the mechanism is associated are permitted to revolve at different speeds, as for instance, when the vehicle turns a corner or otherwise departs from a straight line of travel, and this result is accomplished without employing any one of the several forms of differential gears which have been universally employed in the past to secure this result.

My invention contemplates the provision of a number of improved features of construction and mode of operation, all of which are fully set forth in the following detailed description, and are illustrated in the accompanying drawings, in which, Figure 1 is a view partly in section and partly in elevation illustrating the vehicle driving mechanism embodying my invention, Fig. 2 is a view partly in section and partly in elevation of that portion of the mechanism associated with one of the driving wheels of the vehicle, Fig. 3 is a fragmentary elevational view illustrating a portion of the driving shaft and one of the blocks or driving elements arranged to be locked or placed in driving or driven relation to one of the driving wheels of the vehicle, Fig. 4 is a view partly in section and partly in elevation of a slightly modified embodiment of my invention, Fig. 5 is a fragmentary detailed view illustrating a slightly modified form of block and associated ring for preventing displacement, and assuring simultaneous operation of the several locking dogs associated with the block, and Fig. 6 is a view partly in section and partly in elevation of a modified embodiment of my invention wherein the vehicle driving wheels are provided with roller bearings and the devices for operatively connecting the driving shaft and wheels are readily accessible from the outer sides of the wheels.

Similar reference numerals refer to similar parts throughout the several views.

Referring first to Fig. 1, I have illustrated at 7 a vehicle axle upon which the vehicle driving wheels are arranged to be mounted. Loosely mounted upon opposite ends of the axle are the driving wheels, each of which comprises a brake drum 8 having an integral hub 9. Radiating from the hubs 9 are the spokes 10 which are securely clamped in position between rings 11 and the adjacent brake drums 8 by suitable bolts 12, or other equivalent means. I wish to have it understood that while I have illustrated the vehicle driving wheels in some detail the essential features of my invention may be utilized in connection with any form of vehicle driving wheel. Any suitable means may be provided for driving the axle 7, as for instance, the chain drive mechanism illustrated in Fig. 1. This mechanism comprises a sprocket wheel and a chain 14 arranged to operatively connect the sprocket wheel 13 with the vehicle power plant.

Disposed within each of the drums 8 is an annular element 15 which is rigidly secured to the drum by suitable screws or bolts as illustrated. Each of the annular members 15 is disposed concentric with the axis of the axle 7 and is provided with relatively heavy internal ratchet teeth as is most clearly illustrated in Fig. 2. Secured to each of the annular members 15 by any suitable means is a plate 16 which is provided with a relatively long sleeve or hub 17 fitting around the axle 7. Disposed concentric with each of the annular members 15 is a substantially circular block or disk 18, each of said disks being located in the space formed between one of the brake drums 8 and its associated plate 16. Each of the blocks or disks 18 is splined to the axle 7 or is otherwise arranged to be fixed with respect to the axle.

As is perhaps most clearly illustrated in Fig. 2 a plurality of recesses 19 are formed in the periphery of each of the blocks or disks 18 and disposed in each of said recesses is a dog 20 provided with ratchet teeth arranged to engage and coöperate with the internal ratchet teeth of its associated annular member 15. As is illustrated in Fig. 2 each of the dogs 20 is provided with cam surfaces 21 and 22, arranged to coöperate with corresponding cam surfaces 21$^a$ and 22$^a$ formed on the associated disk or block 18. As is clearly illustrated in Fig. 2 I find it desirable to have the coöperating cam surfaces somewhat oblique to each other. I wish to state at this point that in practice I find it desirable to have the coöperating ratchet teeth of the annular members 15 and dogs 20 quite heavy. I find that teeth which at their points have angles of substantially 120 degrees are quite satisfactory.

Formed in the blocks or disks 18 adjacent each one of the dogs 20 is an opening 23, in which operates a spring pressed plunger 24. It will be seen that the spring 25 associated with each plunger normally tends to hold the associated dog 20 in engagement with the teeth of its coöperating annular member 15. Disposed around each of the blocks or disks 18 is a ring 26 having openings therein, through which pass the dogs 20 and in which the said dogs are freely disposed. The arrangement is such that no one of the several dogs associated with one of the blocks 18 may move angularly with respect to the block without at the same time moving the other dogs.

The axle 7 is provided with a longitudinal slot 27 in which is carried a rocker-shaft 28. The rocker-shaft is provided at its ends with crank arms 29, the free end of each crank arm being fitted in an aperture 30 in the associated ring 26. Each of the blocks or disks 18 has a sector thereof cut away as illustrated at 31 in Fig. 2 in order that the crank arms 29 of the rocker-shaft may be permitted to travel within certain limits.

Having now described the structure of the driving mechanism illustrated in Figs. 1, 2 and 3, I shall explain the operation thereof. Let us assume that to drive the vehicle in a forward direction the axle 7 is rotated in the direction indicated by the arrow in Fig. 2. As the axle is so rotated, the block 18 at each end of the axle will also be rotated. As has been previously explained the spring and plunger mechanism associated with the dogs 20 normally serves to hold the teeth of the dogs in engagement with the coöperating teeth of the annular members 15. When the blocks 18 are rotated in the direction indicted by the arrow in Fig. 2, as before stated, the cam surfaces 22$^a$ of the blocks 18 are brought into engagement with their coöperating cam surfaces 22 of the dogs 20 and thus the teeth of the dogs are forced tightly into engagement with the teeth of the annular members 15 to lock the annular members 15 with respect to the blocks 18 and axle 7. When this locking occurs, as set forth, each of the wheels is, of course, positively driven from the axle 7 upon which it is mounted. As the vehicle departs from a straight line of travel one of the driving wheels will rotate faster than the other, as is well known to those in the art to which my invention relates. When this occurs the annular member 15 associated with the faster rotating driving wheel rotates ahead of its associated block or disk 18. When this takes place the dogs 20 are moved from their locking positions previously assumed to their neutral positions, or nearly to their neutral positions, this being permitted by the lost motion between the parts, the torsional spring of rocker shaft 28, or both. The annular member 15 associated with the faster moving wheel ratchets ahead of its associated dogs 20, after this operation has occurred, the rocker shaft serving to prevent the dogs associated with the faster moving wheel from being moved to locking position during the ratcheting operation. As soon as the rates of rotation of the driving wheels are again the same the driving wheels are positively driven from the axle as before. When the axle 7 is driven in reversed direction to move the vehicle backward the same operation occurs except that in this case the cam surfaces 21$^a$ of the blocks or disks 18 engage the cam surfaces 21 of the dogs 20 to accomplish the locking of the parts.

Let us now assume that the vehicle is traveling down hill with the engine driven from the driving wheels through the transmission mechanism. If in such a case the machine is traveling forward the cam surfaces 21 of dogs 20 are brought into engagement with the cam surfaces 21$^a$ of the blocks or disks 18. If when the rear axle is being driven from the wheels, as set forth, the direction of the vehicle is changed, the shaft continues to rotate with the faster revolving wheel. When this occurs the dogs 20 associated with the slower wheel are, on account of the rocker arms 28, prevented from slipping back so that the cam surfaces 22 of said dogs may engage the coöperating cam surfaces of the block or disk 18 associated with the slower moving wheel. In other words when the axle is being driven from the driving wheels if the vehicle departs from a straight line of travel the dogs 20 associated with the slower moving wheel are permitted to slip or ratchet with the annular member 15 associated with the slower moving wheel, and the axle ratchets ahead of the slower moving wheel.

The modified embodiment of my invention illustrated in Fig. 4 is illustrated in connection with the wheel of the wire spoke type. In this view the axle is shown at 40, and loosely mounted upon each end of the axle are disks 41 and 42 which are provided with integral hubs and which are secured together to constitute a housing for a disk or block 43 in all respects similar to the corresponding disks or blocks 18 illustrated in Figs. 1, 2 and 3. In the embodiment of my invention shown in Fig. 4 the annular members arranged to coöperate with the disks 43 are illustrated at 44 and are formed integral with the disks 42, the disks 42 being provided with suitable flanges to provide brake drums, as illustrated. It will be seen that in the form of my invention shown in Fig. 4, access to the locking devices associated with each wheel is permitted through an opening at the outside of the wheel normally closed by a closure plate 45 threaded upon the hub of the plate 41. The devices for locking the disks 43 with respect to the wheels are identical with the corresponding parts illustrated in Figs. 1, 2 and 3.

In Fig. 5 I have illustrated at 50 a portion of a block or disk generally similar to the blocks or disks illustrated in Fig. 2, and associated with the block or disk 50 is a ring 51, generally similar to the ring 26 shown in Figs. 1 and 2. It will be noted that the disk 50 is rabbeted at 52 to receive a flange 53 formed integral with the ring 51. This arrangement is particularly useful in arrangements such as the one illustrated in Fig. 4, the flange and rabbeted arrangement effectually serving to prevent relative displacement of the disk and ring.

In the embodiment of my invention illustrated in Fig. 6, the vehicle axle is illustrated at 60, and at 61 is shown a sleeve or housing for the axle, the said housing serving to provide bearings for the vehicle wheels. Each of the vehicle wheels comprises a hub 62, having roller races 63. Carried by the sleeve 61 are corresponding roller races 64 and interposed between the roller races are rollers 65 as illustrated. Suitable nuts and lock nuts are provided to retain the hubs of the vehicle wheels upon the sleeve or housing 61. Formed integral with the hub of each of the vehicle wheels is a flange 66' which provides a housing for the roller bearings and the devices for locking the vehicle wheel with respect to the axle 60. As is illustrated in Fig. 6 the block or disk 66 corresponding with the block or disk 18 shown in Fig. 1, is splined upon the axle 60 and bolted or screwed to the sleeve 61 is an annular element 67 corresponding with the annular element 15 illustrated in Figs. 1 and 2. The mechanism for locking the disk 66 to the annular member 67 and for affording connection between the locking devices associated with the mechanism of each driving wheel is identical with the mechanism disclosed in Figs. 1, 2 and 3. Access to the locking devices for each wheel is permitted through an opening normally closed by a suitable closure plate 68. As illustrated each of the wheels may be of the wire spoke type. Fixed with respect to each wheel is the usual brake drum 69, the purpose of which will be understood by all persons skilled in the art to which my invention relates.

From the above description it will be readily seen that a large number of embodiments of my invention may be provided without employing the particular constructions herein shown and described.

What I claim as new and desire to secure by Letters Patent of the United States is:—

1. In combination, a rotatable shaft, a pair of wheels loosely mounted upon the shaft, an annular member fixed with respect to each wheel, said annular members provided with internal teeth, a substantially circular block disposed in each annular member and fixed with respect to the shaft, a plurality of recesses formed in the periphery of each of said blocks, a dog disposed in each of said recesses and provided with teeth arranged to coöperate with the teeth of its associated annular member, means for connecting the several dogs associated with each block, and devices for connecting said last-mentioned means.

2. In combination, a rotatable shaft, a pair of wheels loosely mounted upon the shaft, an annular member fixed with respect to each wheel, said annular members provided with internal teeth, a substantially circular black disposed in each annular member and fixed with respect to the shaft, a plurality of recesses formed in the periphery of each of said blocks, a dog disposed in each of said recesses and provided with teeth arranged to coöperate with the teeth of its associated annular member, a ring for connecting the several dogs associated with each block, and means comprising a rocker shaft for connecting said rings.

3. In combination, a rotatable shaft, a pair of wheels loosely mounted upon the shaft, an annular member fixed with respect to each wheel, a substantially circular block disposed in each of said annular members and fixed with respect to the shaft, a plurality of recesses formed in the periphery of each block, a dog disposed in each of said recesses, each of said blocks and its associated dogs provided with coöperating cam surfaces, devices for connecting the several dogs associated with each block, and mechanism for connecting said devices.

4. In combination, a rotatable shaft, a pair of wheels loosely mounted upon the shaft, an annular member fixed with respect to each wheel, a substantially circular block disposed in each of said annular members and fixed with respect to the shaft, a plurality of recesses formed in the periphery of each block, a dog disposed in each of said recesses, each of said blocks and its associated dogs provided with coöperating cam surfaces, a ring for connecting the several dogs associated with each of said blocks, and means comprising a rocker shaft for connecting said rings.

5. In combination, a rotatable shaft, a pair of wheels loosely mounted on said shaft, an annular member fixed with respect to each wheel, a block disposed in each of said annular members and fixed with respect to the shaft, a plurality of recesses formed in the periphery of each block, dogs disposed in said recesses, said dogs arranged to effect connection between their associated block and the annular member, a ring disposed around each block and arranged to embrace the several dogs associated with the block, and means for connecting said rings.

6. In combination, a rotatable shaft, a pair of wheels loosely disposed on said shaft, an annular member fixed with respect to each wheel, a block disposed in each of said annular members and fixed with respect to the shaft, a plurality of recesses formed in the periphery of each block, dogs disposed in said recesses, said dogs arranged to effect connection between their associated block and the annular member, a ring disposed around each block and provided with apertures arranged to receive and freely embrace the several dogs associated with the block, and means for connecting said rings.

7. In combination, a rotatable shaft, a pair of wheels loosely mounted on said shaft, an annular member fixed with respect to each wheel, a substantially circular block disposed in each annular member and fixed with respect to the shaft, a plurality of recesses formed in the periphery of each of said blocks, a dog disposed in each of said recesses, said annular members being provided with internal teeth and said dogs being provided with teeth arranged to coöperate with the teeth of the annular member, a ring disposed around each of said blocks and provided with apertures arranged to receive and freely embrace the several dogs associated with the block, and means for connecting said rings.

8. In combination, a rotatable shaft, a pair of wheels loosely mounted upon the shaft, an annular member fixed with respect to each of said wheels, said annular members provided with internal teeth, a substantially circular block disposed in each of said annular members and fixed with respect to the shaft, a plurality of recesses formed in the periphery of each of said blocks, a dog disposed in each of said recesses and provided with teeth arranged to coöperate with the teeth of its associated annular member, a ring encircling each of said blocks and provided with apertures arranged to receive and freely embrace the several dogs associated with the block, and means comprising a rocker shaft arranged to operatively connect the rings.

9. In combination, a rotatable shaft, a pair of wheels loosely mounted upon the shaft, each of said wheels comprising an annular member fixed with respect thereto, a block disposed in each of said annular members, said blocks fixed with respect to the shaft, a recess formed in each of said blocks, a dog disposed in each of said recesses and arranged to operatively connect its associated block and annular member, each of said blocks having cam surfaces arranged to coöperate with its associated dog, means for connecting said dogs, and resilient means normally tending to maintain each of said dogs in engagement with its associated annular member.

10. In combination, a rotatable shaft, a pair of wheels loosely mounted upon the shaft, each of said wheels comprising an annular member fixed with respect thereto, a block disposed in each of said annular members, said blocks fixed with respect to the shaft, a recess formed in each of said blocks, a dog disposed in each of said recesses and arranged to operatively connect its associated block and annular member, each of said blocks having cam surfaces arranged to coöperate with its associated dog, means for connecting said dogs, and spring and plunger mechanism associated with each dog arranged to normally maintain it in engagement with its associated annular member.

11. In combination, a rotatable shaft, a pair of wheels loosely mounted upon the shaft, each of said wheels comprising an annular member, a block disposed in each of said annular members, said blocks being fixed with respect to the shaft, a recess formed in the periphery of each of said blocks, a dog disposed in each of said recesses and arranged to operatively connect its associated block and annular member, said annular members being provided with internal teeth and said dogs being provided with teeth arranged to coöperate with the teeth of the annular members, each of said blocks having cam surfaces arranged to coöperate with its associated dog, means for connecting said dogs, and resilient means normally tending to maintain each of said dogs in engagement with its associated annular member.

12. In combination, a rotatable shaft, a pair of wheels loosely mounted on the shaft, each of said wheels comprising an annular member, a block disposed in each of said annular members, said blocks being fixed with respect to the shaft, a plurality of recesses formed in the periphery of each block, a dog disposed in each of said recesses, said blocks arranged to operatively connect their associated blocks and annular members, each of said blocks having cam surfaces arranged to coöperate with its associated dogs, means for connecting the several dogs associated with each block, and devices for connecting said last-mentioned means.

13. In combination, a rotatable shaft, a pair of wheels loosely mounted on the shaft, each of said wheels comprising an annular member fixed with respect thereto, a block disposed in each of said annular members, said blocks being fixed with respect to the shaft, a plurality of recesses formed in each of said blocks, a dog disposed in each of said recesses, each of said blocks having cam surfaces arranged to coöperate with its associated dogs, said annular members provided with internal teeth and said dogs provided with teeth arranged to coöperate with the teeth of the annular members, a ring encircling each of said blocks arranged to connect the several dogs associated with the block, and means comprising a rocker shaft for connecting said rings.

14. In combination, a rotatable shaft, a wheel loosely mounted upon said shaft, said wheel comprising an annular member fixed with respect thereto, a substantially circular block fixed relatively to the shaft and disposed in said annular member, a plurality of recesses formed in the periphery of said block, a dog disposed in each of said recesses, said block provided with cam surfaces arranged to coöperate with each of the several dogs, a ring disposed around said block and arranged to connect the several dogs, and means operable by the relative movement of the shaft and wheel arranged to move the dogs to lock the block with respect to the annular member.

15. In combination, a rotatable shaft, a wheel loosely mounted upon said shaft, said wheel comprising an annular member fixed with respect thereto, a substantially circular block fixed relatively to the shaft and disposed in said annular member, a plurality of recesses formed in the periphery of said block, a dog disposed in each of said recesses, said block provided with cam surfaces arranged to coöperate with each of the several dogs, a ring disposed around said block and arranged to connect the several dogs, and means operable by the relative movement of the shaft and wheel arranged to move the dogs to lock the block with respect to the annular member, said annular member provided with internal teeth and said dogs provided with teeth arranged to coöperate with the teeth of the annular member.

16. In combination, a rotatable shaft, a wheel loosely mounted upon said shaft, said wheel comprising an annular member fixed with respect thereto, a substantially circular block fixed relatively to the shaft and disposed in said annular member, a plurality of recesses formed in the periphery of said block, a dog disposed in each of said recesses, said block provided with cam surfaces arranged to coöperate with each of the several dogs, a ring disposed around said block and arranged to connect the several dogs, means operable by the relative movement of the shaft and wheel arranged to move the dogs to lock the block with respect to the annular member, and spring means normally tending to maintain each of said dogs in engagement with the annular member.

17. In combination, a rotatable shaft, a pair of wheels loosely mounted on said shaft, each of said wheels provided with a suitable bearing, an annular member associated with each of said wheels and fixed relatively thereto, a block disposed in each of said annular members and fixed with respect to the shaft, a recess in each of said blocks, a dog disposed in each recess arranged to lock its associated block and annular member, and means for connecting said dogs.

18. In combination, a shaft, a wheel mounted upon the shaft and rotatable with respect thereto, a suitable bearing for said wheel, an annular member fixed with respect to said wheel, a block disposed in said annular member, a recess formed in the periphery of said block, a dog disposed in said block, and means operable by the relative movement of the wheel and block arranged to control the position of said dog.

19. In combination with an annular outer member provided with internal teeth, an inner member provided with a recess, a dog disposed in the recess, said dog provided with teeth arranged to coöperate with the teeth of the annular member, said inner member and dog provided with coöperating surfaces, and means for moving the dog with respect to the inner member to effect engagement or disengagement of the teeth of the dog and annular member.

20. In combination with an annular outer member, an inner member provided with a recess, a dog disposed in the recess, said dog arranged to coöperate with the annular member, said inner member and dog provided with coöperating surfaces, and means for moving the dog with respect to the inner member to effect engagement or disengagement of the dog and annular member.

21. Differential mechanism comprising a driving member provided with major clutch teeth, a driven member having minor clutch teeth, a plurality of clutch members, each having major clutch teeth in mesh with the teeth of the driving member and minor clutch teeth adapted to mesh with the teeth of the driven member, and means connecting the clutch members to prevent rotative movement of the clutch members relative to the driving member independently of each other.

22. Differential mechanism comprising a driving member and a driven member, one of the members being provided with major clutch teeth and the other with minor clutch teeth, a plurality of clutch devices, each having major clutch teeth in mesh with the major clutch teeth of the member provided with such teeth, and provided also with minor clutch teeth arranged to mesh with the minor clutch teeth of the member containing such teeth, and means connecting the clutch devices to prevent rotative movement of the clutch devices relative to the member containing the major clutch teeth independently of each other.

23. Differential mechanism comprising a driving part having major clutch teeth, two driven members, each containing minor clutch teeth, a plurality of clutch members interposed between the driving part and each of the driven members, each clutch member having major clutch teeth in mesh with the teeth of the driving part and minor clutch teeth arranged to mesh with the minor clutch teeth of its associated driven member, and means for permitting and limiting rotative movement of the clutch members associated with one of the driven members relative to the clutch members associated with the other driven member and for allowing said clutch members to move toward and from the driven members.

24. Differential mechanism comprising a driving part having major clutch teeth, two driven parts, each containing minor clutch teeth, a plurality of clutch members interposed between the driving part and each one of the driven parts, each clutch member having major clutch teeth in mesh with the teeth of the driving part and minor clutch teeth arranged to mesh with the minor clutch teeth of its associated driven part, means for permitting and limiting rotative movement of the clutch members associated with one of the driven parts relative to the clutch members associated with the other driven part and for allowing said clutch members to move toward and from the driven parts, and yieldable means to urge the clutch members into mesh with the teeth of the respective driven parts.

25. In differential mechanism the combination of a pair of annular driven parts having internal minor clutch teeth, a driving part extending into the driven parts and provided with major clutch teeth, a pair of clutch members, each interposed between the driving part and one of the driven parts, each clutch member having major clutch teeth in mesh with the major clutch teeth of the driving part and having also minor clutch teeth for engagement with the teeth of its associated driven part, and means for permitting and limiting rotative movement of the clutch member associated with one of the driven parts relative to the clutch member associated with the other driven part, and for allowing said clutch members to move toward and from the driven parts.

26. In differential mechanism the combination of a pair of annular driven parts having internal minor clutch teeth, a driving part extending into the driven parts and provided with major clutch teeth, a plurality of clutch members interposed between the driving part and each of the driven parts, each clutch member having major clutch teeth in mesh with the major clutch teeth of the driving part and having also minor clutch teeth for engagement with the teeth of its associated driven part, and means for permitting and limiting rotative movement of the clutch members associated with one of the driven parts relative to the clutch members associated with the other driven part and for allowing said clutch members to move toward and from the driven parts.

27. Differential mechanism comprising a pair of annular driven parts having internal minor clutch teeth, a cylindrical driving part extending into the driven parts and provided on its periphery with major clutch teeth, a plurality of clutch members interposed between the driving part and each of the driven parts, each clutch member having major clutch teeth in mesh with the major clutch teeth of the driven part and having also minor clutch teeth for engagement with the teeth of its associated driven part, a pair of rings encircling the driving part, each connecting the clutch members of one of the driven parts but permitting movement of the clutch members toward and from their driven part, and means connecting the rings to permit and to limit relative rotative movement of the rings.

28. Differential mechanism comprising a pair of annular driven parts having internal minor clutch teeth, a cylindrical driving part extending into the driven parts and provided on its periphery with major clutch teeth, a plurality of clutch members interposed between the driving part and each of the driven parts, each clutch member having major clutch teeth in mesh with the major clutch teeth of the driving part and having also minor clutch teeth for engagement with the teeth of its associated driven part, a pair of rings encircling the driving part, each connecting the clutch members of one of the driven parts but permitting movement of the clutch members toward and from their driven part, means connecting the rings to permit and to limit relative rotative movement of the rings, and yieldable means to urge the clutch members into mesh with the respective driven parts.

In witness whereof, I hereunto subscribe my name this 24th day of October, A. D. 1914.

WILLIAM LUXMORE.

Witnesses:
A. G. McCaleb,
H. A. Neiburger.

Copies of this patent may be obtained for five cents each, by addressing the "Commissioner of Patents, Washington, D. C."